United States Patent [19]

Rubens et al.

[11] Patent Number: 4,804,507

[45] Date of Patent: Feb. 14, 1989

[54] PROCESS AND APPARATUS FOR PRODUCING GAS PRESSURIZED FOAM PARTICLES

[75] Inventors: Louis C. Rubens; Stephen P. Chum, both of Midland, Mich.

[73] Assignee: The Dow Chemical Company, Midland, Mich.

[21] Appl. No.: 185,639

[22] Filed: Apr. 25, 1988

[51] Int. Cl.⁴ ............................................ B29C 67/22
[52] U.S. Cl. ..................................... 264/50; 264/51; 264/DIG. 5; 264/DIG. 15; 264/DIG. 18; 425/4 R
[58] Field of Search ................... 264/51, 50, DIG. 5, 264/DIG. 15, DIG. 18; 425/4 R

[56] References Cited

U.S. PATENT DOCUMENTS 3,953,558 4/1976 Hatano et al. ................... 264/50 X
4,360,484 11/1982 Rubens ............................... 264/28
4,693,856 9/1987 Rubens et al. ................. 264/53 X

*Primary Examiner*—Philip Anderson
*Attorney, Agent, or Firm*—Richard A. Killworth

[57] ABSTRACT

Closed-cell foam particles are pressurized to produce particles useful in a process using secondary foaming to achieve a lower density foam. Closed-cell foam particles are initially compressed in a first stage compression tank and then transferred to a main gas pressurization tank. The main gas pressurization tank comprises multi-level shelves, each with a set of compartments. Charges of foam particles pass sequentially through the shelves while becoming fully pressurized. The multi-level shelves with means to move charges of foam particles from shelf to shelf are responsible for the closed cell foam particles becoming pressurized in an efficient manner.

18 Claims, 2 Drawing Sheets

PROCESS AND APPARATUS FOR PRODUCING GAS PRESSURIZED FOAM PARTICLES

BACKGROUND OF THE INVENTION

This invention relates to the production of foam particles suitable for secondary foaming. More particularly, the invention relates to a process and apparatus for producing gas pressurized foam particles.

Thermoplastic resin foam materials with closed-cell structures are well known. Such materials are made by incorporating a physical blowing agent or a chemical blowing agent into a resin composition and thereafter heating the composition. Gases which are created during the heating step expand the resin material to form a cellular mass. It is also known that the resultant closed-cell foam material can be induced to further expand. This added expansion is referred to as secondary foaming. Thus, a thermoplastic closed cell foam material is initially subjected to an inert gas at superatmosphere pressure. The inert gas will ultimately permeate into the foam material's closed cells. Exposure of the pressurized foam material to a lower pressure will cause internal extensional stress. This stress causes the foam to expand further to create an even lower density material when the polymer matrix is heat softened sufficiently to stretch under the influence of this stress. See, for example, Rubens Pat. No. 4,360,484, assigned to the same assignee as the present invention, for a more complete description of this general process and a discussion of the low temperature storage of pressurized prefoamed materials feature.

Closed cell thermoplastic foam materials which have been pressurized for a secondary foaming step are often used in the making of molded articles. Several patents, U.S. Pat. Nos. 2,898,632 and 3,953,558 in particular, describe processes of making molded articles from pressurized foam beads or pellets. See also Rubens et al Pat. No. 4,693,856, assigned to the same assignee as the present invention, for discussion of a molding method and apparatus which may utilize secondary foaming.

A problem which has slowed the full commercialization of the secondary foaming technology has been the inability to efficiently produce gas pressurized closed-cell foam particles suitable for further processing. The processing time needed for an inert gas to permeate into the closed cells of a foam particle is inordinately long, e.g. up to thirty hours even at high pressures. Bulky space consuming processing equipment is also needed. This is in part due to a need for the foam particles to receive a uniform pressurization time for consistent secondary foaming. It is also due in part to a need to ensure that the foam particles are not constricted within the processing equipment as they increase in volume. That is, as the particles expand they tend to agglomerate and bridge across openings, making handling difficult.

Accordingly, the need exists for an improved process and apparatus which allows for the efficient production of the foam particles by substantially reducing process time and equipment needs.

SUMMARY OF THE INVENTION

That need is met by the present invention which provides an improved process and apparatus for producing gas pressurized closed-cell thermoplastic resin foam particles suitable for secondary foaming. Initially, closed cell thermoplastic foam particles are charged to a first stage compression tank wherein the foam particles are subjected to a superatmospheric pressure which usually compresses the foam particles. Because the volume of the foam particles has been decreased in this manner prior to their entry into the main gas pressurization tank, the processing capacity of the main gas pressurization tank is increased by a significant factor.

In any event, the pressurized foam particles are transferred from the first stage compression tank to a main gas pressurization tank. This tank is maintained throughout under an inert gas pressure of from about 10 psig to about 150 psig, preferrable 40–100 psig, and a temperature of from about 30° C to about 90° C. The main gas pressurization tank has multi-level shelves, each with a number of compartments. The use of multi-compartmented, multi-level shelves enables slow, controlled expansion of predetermined quantities of foam particles and minimizes agglomeration and bridging problems. The first charge of foam particles from the first stage compression tank passes through the main gas pressurization tank in stages. Each charge is processed on each of the multi-level shelves. The shelves are constructed to allow gravity transfer of the foam particles to a shelf immediately below it. Each shelf contains a charge of foam particles when steady state is reached.

A charge of gas pressurized foam particles passing from the discharge end of the main gas pressurization tank may be immediately used for molding purposes or may be stored under reduced temperature conditions for later use.

The result of use of the method and apparatus of the present invention is production of foam particles of a more uniform quality in a substantially reduced period of time. Use of a uniform pressurization time in a fist-in-first-out sequence results in an efficient, consistent foaming behavior not found in preexisting processes. In addition optimum equipment utilization is achieved because the foam particles are compressed prior to entering the main gas pressurization tank and are removed while still at least partly compressed.

Accordingly, it is an object of the present invention to provide an improved process and apparatus for producing gas pressurized closed-cell thermoplastic resin foam particles.

Other objects and advantages of the invention will be apparent from the following description, the accompanying drawings and the appended claims.

DETAILED DESCRIPTION OF THE PREFERRED EMBODIMENTS

In the preferred process of the present invention, closed-cell foam particles are treated in a series of process steps. The resultant gas pressurized foam particles are useful to produce molded articles having a lower density than the starting foam particles. Processing of the foam particles as described below is best understood with reference to the drawings.

The closed-cell thermoplastic foam particles used in the starting step of the present invention are well known with many being available in commercial quantities.

Suitable closed-cell foam particles are based on olefinic polymer resins such as polyethylene, polypropylene, copoly(ethylene-vinylacetate), copoly(ethylene-ethyl acetate); polycarbonates; styrenic polymer resins such as copoly(styrene-acrylonitrile); and other thermoplastic resins. A degree of cross-linking in the resin structure will sometimes be used to impart the desired viscoelastic properties for efficient foaming. Methods of introducing the cross-linking such as with high energy radiation and/or chemical crosslinking agent such as peroxides, silane coupling agents are known in the art. Foam particles made from low density polyethylene resins or polypropylene resins are highly preferred.

Foam particles used in the invention may be of any size or shape, primarily dictated by the end use of the final gas pressurized foam particles. For example, cylindrical-shaped particles of foam are normally used when the processed particles are ultimately used in a molding process. Such shapes tend to better fill molds which are typically used. Spherical and cubic-shaped particles are commonly utilized.

Figure 1:
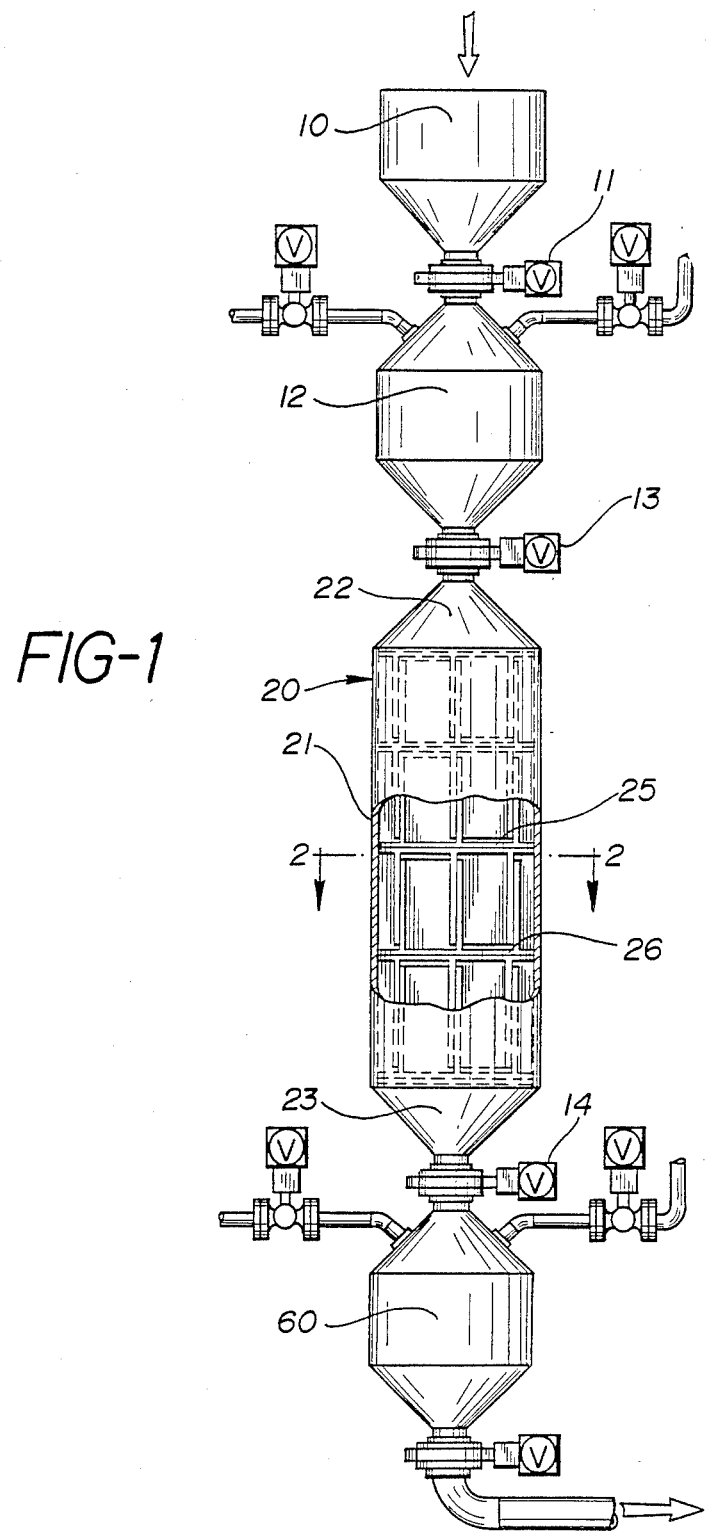
FIG. 1 is a schematic representation of apparatus used in the invention.
Figure 2:
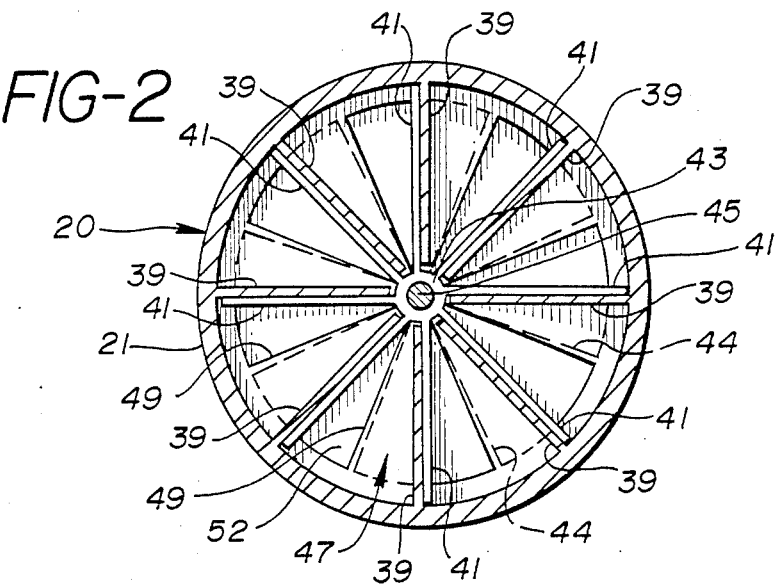
FIG. 2 is a top view of a main gas pressurization tank shown in FIG. 1.

With reference to FIG. 1, there is shown in schematic form apparatus used in the invention. Initially, foam particles at ambient conditions are loaded into hopper 10. The foam particles are necessarily free-flowing. Valve 11 at the discharge end of the hopper is opened to allow a first charge of foam particles to flow into first stage compression tank 12. Valve 13 leading from the discharge end of the compression tank is closed during this loading step. The amount of foam particles loaded into the compression tank is determined primarily by shelf capacity of the main gas pressurization tank used in the next stage of the process as discussed below.

Pressure in the first stage compression tank 12 is increased until from about 40 psig to about 100 psig is reached. The exact pressure is dependent upon the pressure determined to be optimum in the main gas pressurization tank of the next process stage and is equalized thereto. Air, nitrogen or some other inert gas is used in this pressurization stage. Air and nitrogen are preferred gases.

The foam particles are subjected to pressure in the compression tank 12 generally for from about 1 to 60 minutes. This time period is sufficient for the pressure to compress the volume of the foam particles to about 30% to about 40% of their original volume, yet not long enough for the gas to significantly permeate into the closed cells of the foam particles. The reduced volume of the foam particles has the effect of increasing the particles-holding capacity of main gas pressurization tank 20 used in the next step by a factor of 1.5–2.0.

As soon as the foam particles in compression tank 12 reach approximately the same pressure found in the main gas pressurization tank 20, they may be transferred to the main gas pressurization tank 20. Tank 20 is maintained throughout at a pressure of from about 10 psig to about 150 psig, and a temperature of from about 30° C. to about 90° C. A preferred pressure range is about 40 psig to about 100 psig, while a preferred temperature range is from about 70° C. to about 85° C. Maximum cell gas pressure increase is attained at the preferred pressure and temperature. For example, at about 50 psig gas pressure and at a temperature of 70°-80° C., the foam particles will recover to about 45% of their original volume after about 2.5 hours.

Figure 3:
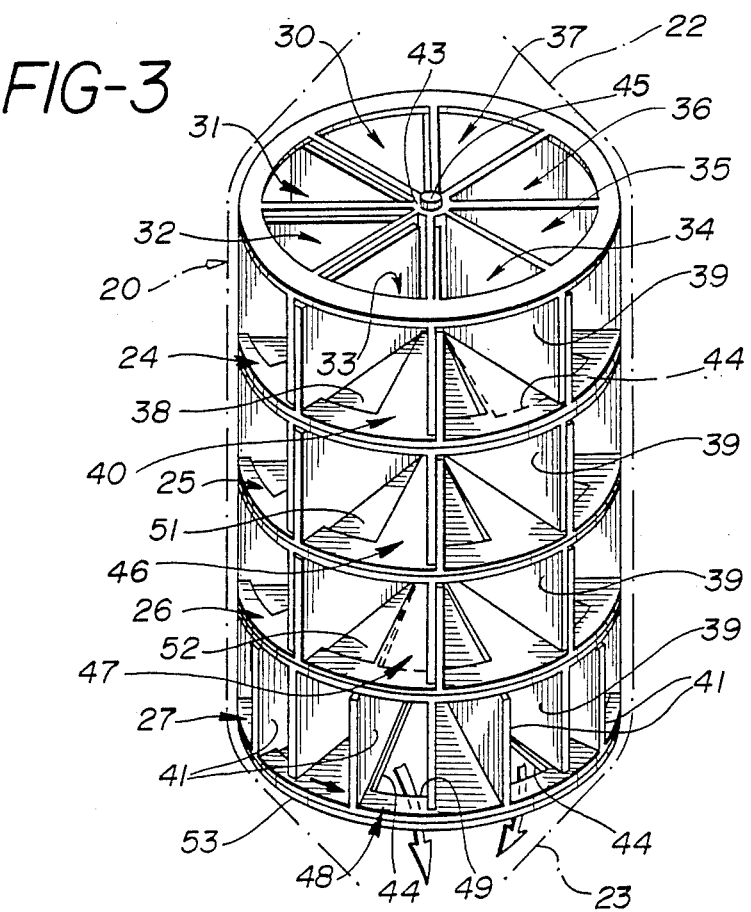
FIG. 3 is a view in perspective showing the main gas pressurization tank of FIG. 2.

Tank 20 comprises an outer wall 21 with a top feed end 22 and a bottom discharge end 23. Valves 13 and 14 are used to isolate the contents of tank 20 during processing. As evident from FIGS. 1 and 3, the tank 20 has a plurality of shelves. Multi-level shelves 24, 25, 26 and 27 extend along the length of the tank and preferably have heights which increase toward discharge end 23. Preferably the distance between the shelves is relatively small, for example 13.1", 14.6", 15.6" and 16.7".

Each shelf has a series of compartments. With reference to shelf 24 in FIG. 3, eight compartments 30-37 of substantially equal volume are formed by a fixed disc 38 with partition plates 39, movable disc 40 with sweep plates 41 and top feed end 22.

Fixed disc 38 is permanently mounted to the outside wall 21. The disc is dimensioned to fit within tank 20. Accordingly, its diameter is substantially equal to the inside diameter of tank 20. Partition plates 39 are securely fastened to disc 38 by conventional means, e.g., welds. Each partition plate is a vertical plate which extends from outer wall 21 to hub 43 at the center of the disc. Openings are cut out of the fixed disc within each compartment area. As shown, opening 44 is pie-shaped, though other shapes are used as well. The opening is positioned preferably to an adjoining partition and should not occupy more than half of the floor area of a compartment.

Shaft 45 extends vertically through the center of main gas pressurization tank 20. The movable discs revolve about said shaft. A power source (not shown) such as a hydraulic cylinder or electric motor is provided to cause the discs to revolve. Movable discs 40, 46, 47 and 48 are positioned on shaft 45 and are capable of moving independently. With reference to disc 48, a series of a vertically extending sweep plates 41 extend from the disc to the shelf above it and from the disc's outer edge to hub 43. The plates are fixed to the movable disc by welds or other conventional fastening means. Each of the movable discs has an opening 49 approximately the same size as that found in the fixed discs. The openings in the fixed disc and movable disc are positioned so as to be capable of alignment with another. As evident from FIG. 3, movable discs 40 and 46-48 rest on fixed discs 38 and 51-53, respectively.

A number of compartments (preferably at least four) in each shelf are provided. Four to eight compartments are preferred because of each of manufacturing reasons and cost-performance optimization. The distance between shelves increases progressively towards the discharge end. The increased shelf spacing or column height in each compartment is needed due to the fact the foam particles gradually expand as they move through the different shelf stages of the main gas pressurization tank 20. Thus, as the inert gas permeates in the closed cells of the foam particles the particles will continue to expand until substantially saturated. The increasing additional column height is needed to ensure the foam particles do not bridge or become immobilized within a compartment. It has been found that the volume recovery on each shelf should not exceed about 1.3 when expressed as the ratio of column height after pressurization to initial height. Generally about 70% to about 80% of a shelf height is occupied by the foam particles at the end of its treatment.

The process of this invention is a semi-batch process. Thus, the initial charge of foam particles from the first stage compression tank is treated on top shelf 24. After about 10 minutes to about 180 minutes, the foam particles are transferred to the shelf 25 and subjected to the elevated pressure for a like amount of time. While the initial charge of foam particles are on shelf 24, another charge of foam particles is being treated in the first stage compression tank. After the initial charge of particles is transferred to shelf 25, the second charge of particles from the first stage compression tank is transferred to top shelf 24. This sequence continues until eventually all shelves depicted in the drawing are loaded.

The foam particles which eventually are discharged from main gas pressurization tank 20 are pressurized fully or a lessor amount if the need dictates. Exposure to ambient temperatures and pressure conditions will cause the inert gas to migrate back out of the foam's closed cells. However, prompt use of the fully pressurized foam particles in a secondary foaming step can be done.

It is preferred that the foam particles which exit from the main gas pressurization tank 20 pass into a refrigerated decompression tank 60. The pressure in the decompression tank 60 is substantially equalized with the pressure in main gas pressurization tank 20 prior to being loaded. Normally the foam particles can remain in the decompression tank 0.5 to 1 hour prior to decompression. Additionally, the temperature in the decompression tank is reduced to at least about $-10°$ C., preferably about $-10°$ C. to about $-30°$ C. before the foam particles are loaded therein.

Opening of valve 14 from discharge end of tank 20 gravity feeds a charge of pressurized foam particles into decompression tank 60. The particles are stirred to speed their cooling. After sufficient time has lapsed for the particles to reach the reduced temperatures within the decompression tank, the tank is slowly vented to atmospheric pressure. Finally, the foam particles are removed from the decompression tank and stored at a reduced temperature, preferably at about $-20°$ C. until need for use in a secondary foaming process. Generally, the pressurized foam particles can be sotred at the reduced temperature for substantial periods of time without a loss of internal pressure. U.S. Pat. No. 4,360,484, issued Nov. 23, 1982 to Louis C. Rubens (the disclosure of which is herein incorporated by reference) contains a detailed description of the decompression stage.

The following example further illustrates the invention.

Example I

A low density polyethylene (commercially available as DOW LDPE 4005) is mixed with 5 weight percent of azobisformamide blowing agent. The mixture is extruded into strands and cut to form 0.76 cm diameter and 0.86 cm length pellets. The pellets are irradiated with 3.5 mrads beta radiation and then foamed by immersion in molten HITEC salt. The foam particles are 1.75 cm in diameter and 1.95 cm long. They have an average density of 0.082 gm/cc.

The foam particles are charged to a first stage compression tank and subjected to over 50 psig at 75° C. The particles now occupy about 35% of their original volume. The compressed foam particles are next transferred to a main gas pressurization tank of the type depicted in FIG. 1. This tank is maintained at 50 psig nitrogen pressure and 75° C. At 50 psig nitrogen and 75° C it will take 10 hours to reach the target nitrogen uptake of 0.1 gm/100 cubic cm of cell volume for the particles used in this example. With four shelves as shown in FIG. 1, the time on each shelf is therefore set for 2.5 hours. The top shelf with 13.1 inches of column height is charged with about 2.13 cubic feet of compressed foam particles. After 2.5 hours the volume of the compressed foam particles increased to 45% of the original foam volume. Next the, particles are then gravity transferred to the next level shelf. Thereafter the first shelf is charged with another charge of foam particles from the compression tank.

The space between the top and second shelves is 14.6 inches. Initially, the foam height in the second shelf is 10.5 inches or 72% of the column height. After about 2.5 hours, the foam height is 11.7 inches or 80% of the column height. The contents of the second shelf is then transferred to the next shelf. Shelf height there is 15.6 inches. The column height of the foam increases from 11.7 inches to 12.5 inches or 80% of the column height. After another 2.5 hours, the contents are transferred to the last shelf. Shelf height there is 6.7 inches. The column height of the foam particles increases to 13.3 inches or 80% of the column height.

The foam volume under 50 psig nitrogen after 10 hours pressurization is still only 57% of the original volume under normal atmospheric pressure. Bulk density under is 0.086 gm/cc.

Each transfer of foam particles to a subsequent shelf is followed by a transfer of foam particles to the vacated shelf from the next higher shelf or, for the top shelf, from the compression tank. At steady state, all four shelves are loaded with individual charges of foam particles.

Foam particles from the bottom shelf of the main gas pressurization tank are transferred to a refrigerated decompression tank. This tank is initially at 50 psig and $-20°$ C. The particles are stirred in the tank to speed cooling while slowly venting to the atmosphere. After venting, the density of the foam particles is 0.76 gm/cc. The volume of foam particles removed from the decompression tank is 6.61 cubic feet. The resultant gas pressurized foam particles are suitable feedstock for a secondary foaming operation. The volume of one gram of the pressurized foam particles heated for one minute in hot air at 120° C. increased by a factor of 2.1 after cooling to room temperature. Actual density of the particles secondarily foamed in this manner was 0.036 gm/cc or 44% of the original foam density.

About 26.44 cubic feet of foam particles (about 75 lbs) are processed in about 10 hours using the above sequence of steps. This is substantially greater than conventional processes. If the foam particles were not pressurized before charging into the main gas pressurization tank, only 38.6 lbs could be pressurized during the same period.

It is also important to note the volume fraction of space occupied by the foam particles relative to their volume at normal atmospheric pressure during each stage of the process. As shown in this example the foam is compressed 35 to 57% during the entire 10 hours in the main gas pressurization tank. The average compression is less than 50%, effectively more then doubling the capacity of the main gas pressurization tank.

Example II

Expandable Polypropylene particles are prepared by mixing a grafted polypropylene copolymer and azobisormamide with the following formulation:

| FORMULATION OF MOLDABLE XLPP BEADS | | |
|---|---|---|
| GRAFTED POLYPROPYLENE: | | |
| Ethylene/Propylene block copolymer | 60 parts | 100 parts |

-continued

| FORMULATION OF MOLDABLE XLPP BEADS | | |
|---|---|---|
| Ethylene/Propylene random copolymer | 40 parts | |
| t-butyl peroxy benzoate (free rad. gen.) | 0.3 parts | |
| Methoxy silane | 1.2 parts | |
| Heat stabilizer | 0.3 parts | |
| MASTERBACH: | | |
| LDPE | 10 parts | 24 parts |
| Azodicarbonamide | 11 parts | |
| Heat stabilizer | 3 parts | |

The mixture is extruded into strands and cut to form 0.50 cm diameter and 0.50 cm length pellets. The pellets are submerged into 80 degree C water for 24 hours to cure. The pellets contain approximately 50 to 65 wt% of insoluble gel (in trichlorobenzene at 150 degree C) after cured in 80 degree C water. The cured pellets are foamed in an nitrogen blanked oven equipped with radiant heaters and a conveyor belt. The foam particles are approximately 1.6 cm in diameter and 1.2 cm long. They have an average density of 0.067 gm/cc.

The foam particles may be charged to a first stage compression tank, transferred to a main gas pressurization tank, and then to a refrigerated decompression tank under the same conditions as set forth in Example I. The resultant gas pressurized foam particles are suitable feedstock for a secondary foaming operation.

The process and apparatus of this invention has been specifically described with reference to the drawings. Obvious modifications may be made and are within the scope of the following claims.

What is claimed is:

1. A process for producing gas pressurized closed-cell foam particles suitable for secondary foaming to a lower density foam, comprising the steps of:
    (a) charging closed cell foam particles to a first stage compression tank wherein the foam particles are subjected to a pressure of from about 10 psig to about 150 psig to compress said foam particles to about 30%–40% of their original volume at atmospheric pressure;
    (b) transferring the pressurized foam particles to a main gas pressurization tank maintained under a pressure of from about 40 psig to about 100 psig and a temperature of from about 30° C. to about 90° C., said gas pressurization tank having multi-level shelves through which individual charges of compressed foam particles sequentially pass, each shelf holding a separate charge of foam particles from the first stage compression tank and further wherein each shelf has a plurality of compartments to prevent bridging and immobilization of the foam particles; and
    (c) passing the foam particles from one shelf to the next in a first-in-first-out sequence, during which said foam particles partially recover their volume without exceeding the free volume in each of said plurality of compartments;
    (d) discharging the foam particles from the last shelf level of the main gas pressurization tank, said foam particles having an internal pressure greater than atmospheric pressure and suitable for secondary foaming.

2. The process of claim 1 further comprising the steps of cooling the gas pressurized foam particles discharged from the main gas pressurization tank in a refrigerated decompression tank maintained at a pressure substantially equal to that found in the main gas pressurization tank and at a temperature of less than about −10° C. and venting the refrigerated decompression tank to the atmosphere while maintaining the reduced temperature of the foam particles, said foam particles capable of being stored for a prolonged period without substantially reducing their secondary foaming capability.

3. The process of claim 2 wherein the pressure maintained in the first stage compression tank is substantially equal to the pressure maintained in the main gas pressurization tank.

4. The process of claim 3 wherein the main gas pressure tank in maintained at a pressure of from about 40 psig to about 100 psig and a temperature of from about 70° C. to about 85° C.

5. The process of claim 4 wherein the main gas pressurization tank has from four to eight shelves.

6. The process of claim 5 wherein the distance between shelves increases progressively towards a discharge end.

7. The process of claim 6 wherein each shelf has from four to eight compartments.

8. The process of claim 7 wherein the main gas pressurization tank has a shaft extending vertically through its center with a set of fixed discs and movable discs mounted on the shaft, said discs forming each shelf, further wherein each of the fixed discs has partition plates extending vertically therefrom and each of the movable discs has sweep plates extending vertically therefrom, said plates forming the compartments of each shelf.

9. The process of claim 8 further wherein each movable disc and fixed disc has an opening through which the foam particles pass when aligned.

10. The process of claim 1 wherein said foam particles are moistened under a nitrogen gas pressure in said first stage compression tank and said main gas pressurization tank.

11. A gas pressurization tank having multi-level shelves to hold separate charges of foam particles and allow transfer of foam particle charges sequentially therethrough, comprising:
    (a) a main tank with charge and discharge openings through which foam particles pass;
    (b) multi-level shelves within the main tank characterized by having a series of at least four compartments at each shelf level with the compartment heights increasing at each shelf level from the charge opening to the discharge opening; and
    (c) means for gravity transferring individual charges of foam particles in compartments found at each shelf level to compartments found at a lower shelf level.

12. The apparatus of claim 11 wherein a floor of each shelf level comprises a fixed disc which fits into the main tank with spaced openings arranged in a sequence and a movable disc with spaced openings arranged in a sequence positioned directly above the fixed disc such that when aligned the movable disc covers the openings in the fixed disc while rotation of the movable disc about its axis a set distance will cause alignment of the openings on the fixed disc with the openings in the movable disc to cause any foam particles within the compartments of the shelf level to drop to a shelf below.

13. The apparatus of claim 12 wherein each fixed disc at least four vertical partition plates extending therefrom to the next shelf level with an opening in the fixed disc between each partition plate.

14. The apparatus of claim 13 wherein each movable disc has a sweep plate extending vertically therefrom to the next shelf level with an opening in the movable disc between each sweep plate.

15. The apparatus of claim 14 wherein each shelf level has from four to eight compartments when the movable disc is revolved such that each of its sweep plates abuts the partition plates of the fixed disc.

16. The apparatus of claim 15 further comprising a shaft which extends vertically through the center of the tank with the movable discs mounted thereon.

17. The apparatus of claim 16 further comprising means to cause the movable discs to independently revolve until the opening in a movable disc is in alignment with the opening in the fixed disc.

18. The apparatus of claim 11 further comprising means to maintain the tank at a pressure of from about 40 psig to about 100 psig and a temperature of from about 30° C. to about 90° C.

* * * * *